United States Patent [19]

Myking

[11] 4,189,202
[45] Feb. 19, 1980

[54] RUBBER SLEEVE DEVICES
[75] Inventor: Reidar Myking, Isdalstø, Norway
[73] Assignee: Hakon Myking Metall-Industri, Isdalstø, Norway
[21] Appl. No.: 890,917
[22] Filed: Mar. 28, 1978
[30] Foreign Application Priority Data
Apr. 5, 1977 [NO] Norway ............................ 771205
[51] Int. Cl.² ................ H01R 13/56; B23K 9/28
[52] U.S. Cl. ........................... 339/101; 16/116 R; 219/138; 219/142; 339/110 R
[58] Field of Search ............... 339/26, 101, 217, 221, 339/110; 219/136, 137.63, 138–144, 225, 227, 229, 533; 16/116 R; 145/61 A, 61 B, 61 C

[56] References Cited
U.S. PATENT DOCUMENTS

| | | | |
|---|---|---|---|
| 1,908,834 | 5/1933 | Engberg et al. ............... | 16/116 R |
| 2,275,280 | 3/1942 | Belden ............................. | 16/116 R |

FOREIGN PATENT DOCUMENTS

| | | | |
|---|---|---|---|
| 731487 | 5/1932 | France ............................... | 219/138 |
| 76195 | 9/1954 | Netherlands ....................... | 219/138 |
| 635970 | 4/1950 | United Kingdom ............... | 219/138 |

*Primary Examiner*—Neil Abrams
*Attorney, Agent, or Firm*—Kenyon & Kenyon

[57] ABSTRACT

Rubber sleeve device for surrounding an electrical current conductor member. The device is adapted for axial displacement relative to the member as well as being prevented from turning relative to that member. The device has a first fastening portion in the form of a support ring composed of a heat-durable, shape-stable, insulating material embedded in the body of the sleeve. The ring is adapted to be in a fixed turning engagement and free fit relation with a fastening portion of the member whereby mutual axial movement of the sleeve and member is permitted. A second fastening portion axially bounds the first fastening portion and is adapted to engage directly and frictionally another fastening portion of the member whereby unintentional mutual axial displacement of the sleeve and the member can be prevented.

11 Claims, 6 Drawing Figures

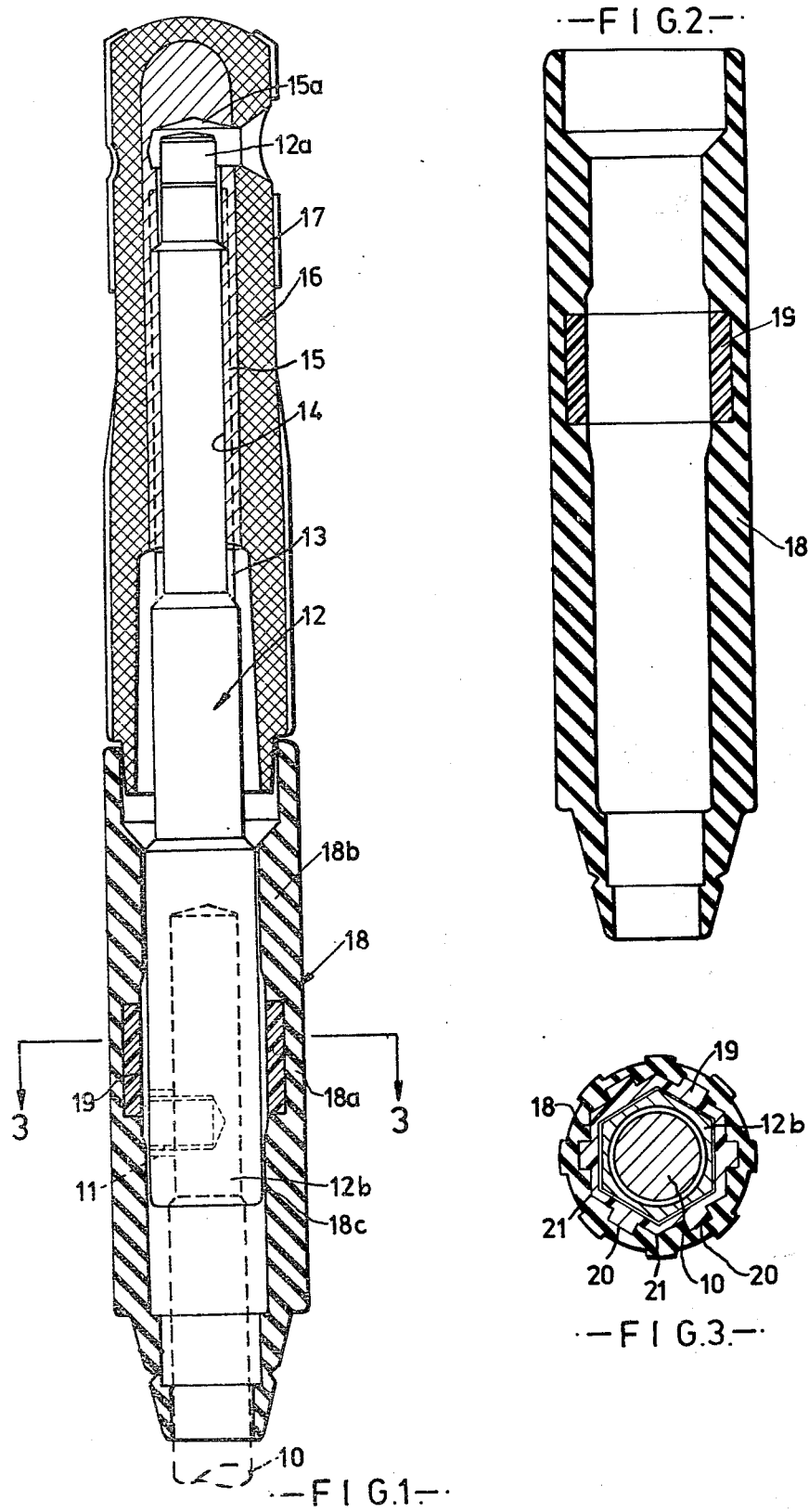

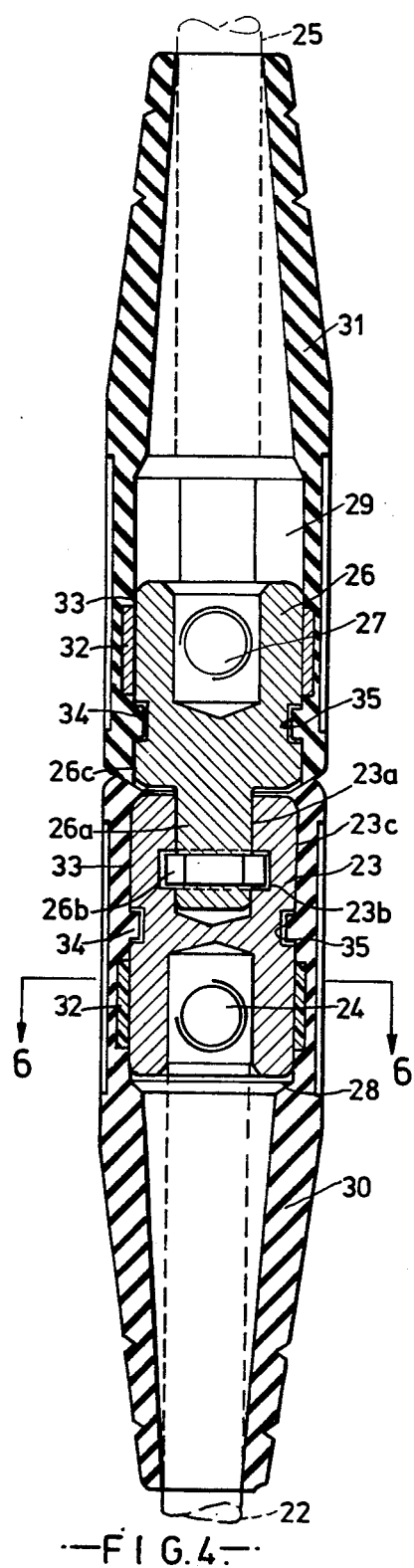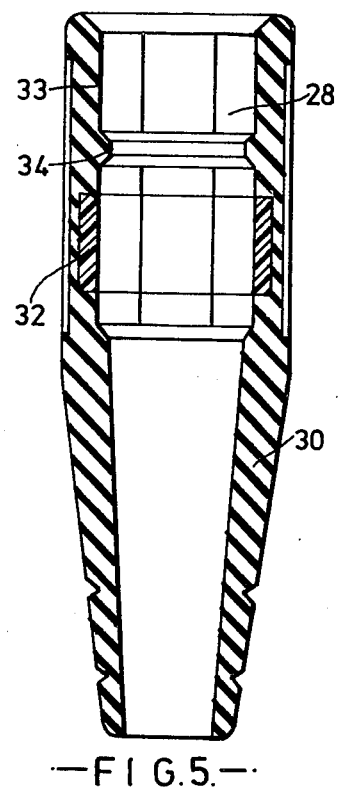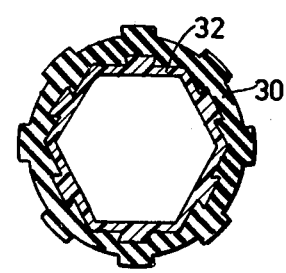

RUBBER SLEEVE DEVICES

This invention relates, inter alia, to rubber sleeve devices for surrounding electrical current conductor members, such as a rubber handle for a welding electrode holder or an insulating sleeve for a cable joint means, where the rubber sleeve, when there is a need for it, can be axially displaced relative to the current conductor member while being prevented from turning relative to the current conductor member.

The present invention finds particular application in connection with welding equipment and specially in connection with welding electrode holders and cable joint means. Strong protective orders have been drawn up in connection with welding equipment. For example, in welding electrode holders, one tries in the best possible manner to protect the welder so that the welder does not come into contact with the current conductor member and adjacent electrically conducting portions and so that electrical penetration is prevented through the rubber handle to the welder. A main objective of the rubber handles used on welding electrode holders is to prevent the occurrence of breakage so that the current conveying or current conducting portions of the electrode holder or its current supply cable are exposed and produce the danger of contact for the welder. In this connection, it is of significance that the rubber handle is soft and elastically yielding. However, there is also a need for maintaining the rubber handle in a certain manner on the current conductor member so that the rubber handle, when there is a need for it, can be drawn axially off the current conductor member in order to expose the latter for inspection, repair and the like. Furthermore, there is a need for procuring an effective turning engagement between the rubber handle and the current conductor member so that the current conductor member can be secured via the rubber handle, while remaining portions of the electrode holder are turned relative to the current conductor member on assembly and disassembly of the welding electrode.

Hitherto, a steel spring of helical construction has been used as a reinforcing material in the rubber sleeve, the steel spring being embedded in the rubber means of the sleeve radially just outside internal stop-forming fastening portions of the rubber sleeve which cooperate with corresponding stop-forming fastening portions of the current conductor portion. In this connection, it has been usual to utilise a current conductor member with a regular hexagonal fastening portion which cooperates with a corresponding regular hexagonal fastening portion internally of the rubber sleeve so that mutual turning of the members can be prevented but mutual axial displacement of the members permitted.

In practice, however, it has been shown that the current conductor member, as a consequence of strong heating during use and corresponding heating of the adjacent fastening portion on the rubber sleeve and of the steel spring reinforcement, has produced changes in the solidity characteristics of the rubber material so that the rubber sleeve has lost inherent shape stability and strength. This has, for one thing, resulted in the rubber sleeve being quick to slip over the stop-forming fastening portion on the current conductor portion as a consequence of the increased pliability of the rubber material. In addition, the danger has occurred that the steel spring on the one side can come into contact with the current conductor member and on the other side with the hand of the welder.

Also in cable joint means there are similar problems. The cable joint means usually consist of a socket element fastened to the one current cable and an insertion element fastened to another adjacent current cable portion. The socket element and the insertion element are pushed together and the pushed together condition is ensured by means of associated locking means and locking grooves on turning the two elements relative to each other. The socket element and the insertion element are each provided with their respective rubber sleeve which are in permanent turning engagement with their respective joint means. Nevertheless, under certain conditions, the rubber sleeve ought to be able to be axially displaced relative to its associated joint means. However, it has hitherto been regarded to be of substantial protective significance that the rubber sleeve is not unintentionally axially displaced relative to the associated current conductor member. In this connection, provision is made for an inwardly projecting annular rib on the rubber sleeve to engage an annular groove on the associated current conductor member. In certain instances, extra rigid and rather non-elastic rubber material has been employed in the rubber sleeve so that any mutual displacement of rubber sleeve and current conductor member is prevented. However, this has involved one having to cut away the rubber sleeve on the desired exposure of the current conductor member relative to the rubber sleeve after a period of use. Alternatively, one has had to cut off the current conductor member with associated rubber sleeves with the consequent rejection of the portions thereof.

With the present invention, the aim is a solution where the rubber sleeve can be retained in a reliable and simple manner on the current conductor member, even after a long period of heavy heat loading on the rubber sleeve, without the danger of producing current passage through the rubber sleeve, without producing slipping of the turning engagement between rubber sleeve and current conductor member and without risking unintentional mutual axial displacement of the rubber sleeve and current conductor member.

Accordingly, the present invention resides in a rubber sleeve device suitable for surrounding an electrical current conductor member and adapted for axial displacement relative thereto while being prevented from turning relative to said member, said device comprising (a) a first fastening portion in the form of a support ring composed of a heat-durable shape-stable, insulating material embedded in the body of said sleeve, said ring being adapted to be in fixed turning engagement as well as in spaced free fit relation with a fastening portion of said member whereby mutual axial movement of said sleeve and said member is permitted, and (b) a second fastening portion axially bounding said first fastening portion and adapted to engage directly and frictionally another fastening portion of said member whereby unintentional mutual axial displacement of said sleeve and said member can be prevented.

The invention also includes a combination which comprises a rubber sleeve device surrounding an electrical current conductor member so as to be axially displaceable relative thereto while being non-turnable relative to said member, said device comprising a first fastening portion in the form of a support ring composed of a heat-durable, shape-stable, insulating material embedded in the body of said sleeve and a second fastening portion axially bounding said first fastening portion and said member having a fastening portion with which said ring is in fixed turning engagement as well as in free fit relation to permit mutual axial movement of said sleeve and said member, and another fastening portion engaged directly and frictionally by said second fastening portion to prevent unintentional mutual axial displacement of said sleeve and said member.

By means of the first fastening portion with associated support ring, there can be ensured a permanent turning engagement between the ring and the current conductor member as well as a permanent fastening between the ring and the rubber sleeve. By suitable choice of the material, there can be obtained a heat durable, shape-stable and insulating support ring which provides the intended permanent turning engagement between the ring and the current conductor member. In addition, the ring can be allowed to serve as a heat-shielding means for the rubber layer lying radially outside. It is preferred to employ a thermosetting synthetic plactics material which is generally a poor heat-conductor. In this way, there is the possibility of obtaining an effective heat-shielded fastening between the ring and the rubber material of the rubber sleeve lying radially outside. By employing a free fit between the ring and the current conductor member, there is also a possibility of creating a minimal contact surface between the ring and the current conductor member thereby reducing, moreover, the possibility of heat conduction from the current conductor member to the ring.

By means of the second fastening portion, which can project a suitable distance radially within the first fastening portion, there is the possibility of holding the first fastening portion at a desired uniform distance from the current conductor member. Thus, by means of the material of the second fastening portion, one can ensure an effective support effect for the rubber sleeve in addition to the intended frictional effect between the rubber sleeve and the current conductor member. If desired, the first fastening portion can be placed between two sections constituting the second fastening portion and extending axially from opposite ends of the first fastening portion so that the support effect and the frictional effect are achieved on both sides of the first fastening portion.

In order that the invention can be more clearly understood, convenient embodiments thereof will now be described, by way of example, with reference to the accompanying drawings in which:

FIG. 1 is a vertical section of a welding electrode holder with a rubber sleeve according to the invention, FIG. 2 is a vertical section of the rubber sleeve, shown on a larger scale, FIG. 3 is a section on the line 3—3 of FIG. 1, FIG. 4 is a vertical section of two cooperating cable joint means each with its associated rubber sleeve according to the invention.

FIG. 5 is a vertical section of the rubber sleeve according to FIG. 4, and

FIG. 6 is a section on the line 6—6 of FIG. 5.

Referring to FIG. 1, there is shown in broken lines a current cable 10 which is secured by a fastening screw 11 in a current conductor member 12 of brass. The current conductor member 12 is provided with an externally threaded portion 13 which cooperates with an internally threaded portion 14 of an electrode holder member 15. The member 15 is provided with an electrically insulating head part 16 having a spark-protective jacket 17. The welding electrode (not shown) is screwed tightly between the end portion 12a of the current conductor member 12 and a bed 15a of the electrode holder member 15 by turning the head part 16 with associated holder member 15 relative to the current conductor member 12. The current conductor member 12 is secured in a hand grip-forming sleeve 18 relatively soft and elastically yielding rubber by a fastening portion 12b of hexagonal cross-section being received in an equivalent fastening portion 18a, 18b, 18c of the rubber sleeve 18.

The rubber sleeve is provided with a first fastening portion 18a which is arranged with a free fit or at a certain radial distance from the current conductor member 12 and with a second, two part fastening portion 18b, 18c which is arranged with a force fit on the current conductor member. The two part second fastening portion is arranged with a part 18b and 18c each on its respective side of the first fastening portion, that is to say axially displaced endways at their respective ends of the first fastening portion.

In the first fastening portion 18a of the rubber sleeve, a rigid support ring 19 is molded in the rubber mass. This ring 19 has a hexagonal inner surface which corresponds to the hexagonal shape of the current conductor member 12 (FIG. 3). The support ring 19 is arranged at a certain, but preferably small, distance from the current conductor member 12. By means of the fastening portion parts 18b and 18c projecting radially inwards, the rubber sleeve is ensured effective support against the current conductor member at opposite ends of the support ring so that a desired uniform distance can be obtained between the support ring and the current conductor member. As a consequence of the corresponding shape in the current conductor member and the support ring, a permanent, firm turning engagement between the current conductor member and the support ring and as a consequence of the intentionally small, but uniform distance between the current conductor member and the support ring, heat-conducting contact between the current conductor member and the support ring can be prevented. Furthermore, provision is made for the support ring to be made of heat-durable and shape-stable material so that the firm turning engagement between the members can be ensured independently of the influence of heat from the current conductor member. By fabricating the support ring 19 from a material of, for example, a thermosetting synthetic plastics material which is generally a poor heat-conducting material, the support ring can, in addition, serve as a heat-shielding means for the rubber layer of the rubber sleeve lying radially outside.

As shown in FIG. 3, the support ring 19 is provided externally with rib-shaped projections 20 which, together with corners 21 of the ring, form an effective anchorage between the support ring 19 and the rubber layer of the rubber sleeve 18 lying radially outside.

The second, two part fastening portion 18b, 18c is formed by the mass of rubber of the rubber sleeve 18. In addition to the support effect which is obtained by the fastening portion 18b, 18c at opposite ends of the fastening portion 18a, there is obtained an effective frictional effect between the rubber sleeve 18 and the current conductor member 12.

In FIG. 4, there is shown a cable joint having one end of a first current cable 22 fastened to a first current conductor member 23 with a fastening screw 24 and with one end of a second current cable 25 fastened to a second current conductor member 26 with a corresponding fastening screw 27. The first current conductor member 23 is fabricated with a socket portion 23a which is adapted to receive an insertion portion 26a from the second current conductor member 26 and is designed with a locking groove 23b which is adapted to receive a locking element 26b on the second current conductor member.

The current conductor members 23 and 26 are brought into locking engagement with each other by suitably turning the members relative to each other. A hexagonal fastening poriton 23c or 26c on the current conductor member 23, 26 engages a corresponding hexagonal guide 28, 29 of an associated rubber sleeve 30 or 31. In a similar way as for the rubber sleeve 18, the rubber sleeves 30 and 31 are provided with a rigid support ring 32 of a thermosetting synthetic plastics material. The rubber sleeves 30 and 31 are further provided with a fastening portion 33 which forms friction-promoting support against the current conductor member. In addition, the rubber sleeve is provided with an annular rubber rib 34 which projects inwardly into an associated annular groove 35 in the associated current conductor member. By means of the rubber rib 34 and the associated annular groove 35, together with the frictional engagement between the fastening portion 33 and the current conductor member, an effective anchorage of the rubber sleeve on the current conductor member can be ensured in an axial direction. By way of the support ring 32, mutual turning between the rubber sleeve and the current conductor member can be prevented in a manner corresponding to that described for the support ring 19 of FIGS. 1-3.

What we claim is:

1. Rubber sleeve device suitable for surrounding an electrical current conductor member and adapted for axial displacement relation thereto while being prevented from turning relative to said member, said device comprising
   (a) a first fastening portion in the form of a support ring composed of a heat-durable, shape-stable, insulating material embedded in the body of said sleeve, said ring being adapted to be in fixed turning engagement as well as in spaced free fit relation with a fastening portion of said member whereby mutual axial movement of said sleeve and said member is permitted, and
   (b) a second fastening portion axially bounding said first fastening portion and adapted to engage directly and frictionally another fastening portion of said member whereby unintentional mutual axial displacement of said sleeve and said member can be prevented.

2. The device of claim 1, wherein said second fastening portion has two sections separated by said first fastening portion and extending axially from opposites ends of the latter portion.

3. The device of claim 1, wherein said ring is composed of a rigid, thermosetting, synthetic plastics material moulded into the body of said sleeve.

4. The device of claim 1, wherein said second fastening portion is composed of a relatively soft and elastically yielding rubber.

5. A combination which comprises a rubber sleeve device surrounding an electrical current conductor member so as to be axially displaceable relative thereto while being non-turnable relative to said member, said device comprising a first fastening portion in the form of a support ring composed of a heat-durable, shape-stable, insulating material embedded in the body of said sleeve and a second fastening portion axially bounding said first fastening portion and said member having a fastening portion with which said ring is in fixed turning engagement as well as in spaced free fit relation to permit mutual axial movement of said sleeve and said member, and said member having another fastening portion engaged directly and frictionally by said second fastening portion to prevent unintentional mutual axial displacement of said sleeve and said member.

6. The combination of claim 5, wherein said second fastening portion has two sections separated by said first fastening portion and extending axially from opposite ends of the latter portion; said two section frictionally engaging said conductor member.

7. The combination of claim 5, wherein said ring is composed of a rigid, thermosetting, synthetic plastics material moulded into the body of said sleeve.

8. The combination of claim 5, wherein said second fastening portion is composed of a relatively soft and elastically yielding rubber.

9. In combination with a current conductor member;
   a soft elastically yieldable rubber sleeve having said current conductor member axially slidably secured therein, said sleeve having at least one fastening portion receiving a similarly shaped fastening portion of said current conductor member in force fit relation and a second portion spaced from and surrounding said current conductor member; and
   a rigid support ring molded in said second portion of said rubber sleeve, said ring having an inner surface corresponding to a surrounded circumferential surface of said current conductor member to prevent relative rotation between said current conductor member and said rubber sleeve, said ring being disposed in spaced relation to said surrounded portion of said member and being made of heat-durable shape-stable material.

10. In combination,
    a current conductor member having an external fastening portion of polygonal cross-section;
    a rubber sleeve axially slidably mounted on said current conductor member, said sleeve having a first fastening portion arranged at a radial distance from said member and a second fastening portion force fit on said fastening portion of said member; and
    a rigid support ring molded in said first fastening portion of said sleeve, said ring having a polygonal inner surface corresponding to and spaced from said fastening portion of said member.

11. The combination as set forth in claim 10 wherein said rigid support ring in made of a thermosetting synthetic plastics material to serve as a heat-shielding means for said rubber sleeve radially outside said ring.

* * * * *

UNITED STATES PATENT AND TRADEMARK OFFICE
CERTIFICATE OF CORRECTION

PATENT NO. : 4,189,202
DATED : February 19, 1980
INVENTOR(S) : Reidar Myking

It is certified that error appears in the above–identified patent and that said Letters Patent are hereby corrected as shown below:

Column 3, line 21, change "plactics" to --plastics--

Column 5, line 12, change "poriton" to --portion--

Column 5, line 39, change "relation" to --relative--

Column 5, line 59, change "opposites" to --opposite--

Column 6, line 23, change "section" to --sections--

Column 6, line 61, change "in" to --is--

Signed and Sealed this

Twenty-fourth Day of June 1980

[SEAL]

Attest:

SIDNEY A. DIAMOND

Attesting Officer    Commissioner of Patents and Trademarks